United States Patent
Singhal et al.

(10) Patent No.: US 10,860,430 B2
(45) Date of Patent: Dec. 8, 2020

(54) SYSTEM AND METHOD FOR RESILIENT BACKUP GENERATION

(71) Applicant: EMC IP Holding Company LLC, Hopkinton, MA (US)

(72) Inventors: Upanshu Singhal, Bangalore (IN); Shilpa Mehta, Bangalore (IN); Shivakumar Kunnal Onkarappa, Bangalore (IN); Archit Seth, Bangalore (IN); Chakraveer Singh, Bangalore (IN); Chandra Prakash, Bangalore (IN); Rahul Bhardwaj, Udaipur (IN); Pradeep Mittal, Karnal (IN); Kumari Priyanka, Bengaluru (IN); Akansha Purwar, Bangalore (IN); Lalita Dabburi, Bangalore (IN); Manish Sharma, Bangalore (IN); Asif Khan, Bangalore (IN); Shelesh Chopra, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 250 days.

(21) Appl. No.: 16/028,670

(22) Filed: Jul. 6, 2018

(65) Prior Publication Data
US 2020/0012570 A1    Jan. 9, 2020

(51) Int. Cl.
*G06F 17/00* (2019.01)
*G06F 11/14* (2006.01)
*G06F 9/455* (2018.01)

(52) U.S. Cl.
CPC ...... *G06F 11/1461* (2013.01); *G06F 9/45558* (2013.01); *G06F 2009/45583* (2013.01); *G06F 2201/815* (2013.01)

(58) Field of Classification Search
None
See application file for complete search history.

(56) References Cited

U.S. PATENT DOCUMENTS

| 8,713,376 B1* | 4/2014 | Makin | G06F 11/1461 |
| | | | 714/47.1 |
| 9,471,441 B1* | 10/2016 | Lyadvinsky | G06F 11/1461 |
| 9,977,704 B1* | 5/2018 | Chopra | G06F 11/1464 |
| 2008/0270838 A1* | 10/2008 | Dorai | G06F 11/1461 |
| | | | 714/38.14 |
| 2009/0216816 A1* | 8/2009 | Basler | G06F 11/1464 |
| 2010/0211821 A1* | 8/2010 | Donie | G06F 11/2097 |
| | | | 714/6.11 |

(Continued)

*Primary Examiner* — Hasanul Mobin
(74) *Attorney, Agent, or Firm* — Chamberlain, Hrdlicka, White, Williams & Aughtry

(57) ABSTRACT

A computing device for storing backups of virtual machines includes a persistent storage and a backup manager. The persistent storage stores backup policies. The backup manager identifies an end of a backup generation session for a virtual machine of the virtual machines and, in response to identifying the end of the backup generation session, identifies a continuity chain implicated by the backup generation session using the backup policies; performs a membership analysis of the identified continuity chain to identify a continuity state of the continuity chain; makes a first determination that the identified continuity chain is broken based on the identified continuity state; and, in response to the first determination, remediates the continuity chain.

11 Claims, 13 Drawing Sheets

(56) References Cited

U.S. PATENT DOCUMENTS

| | | | |
|---|---|---|---|
| 2011/0302140 A1* | 12/2011 | Gokhale | G06F 11/2023 707/645 |
| 2012/0110584 A1* | 5/2012 | Chaudhry | G06F 9/5027 718/102 |
| 2012/0278525 A1* | 11/2012 | Serebrin | G06F 11/1464 711/6 |
| 2013/0024598 A1* | 1/2013 | Serebrin | G06F 12/1036 711/6 |
| 2013/0191320 A1* | 7/2013 | Avritzer | G06N 7/005 706/52 |
| 2014/0201564 A1* | 7/2014 | Jagtiani | G06F 11/203 714/4.11 |
| 2014/0281700 A1* | 9/2014 | Nagesharao | H04L 69/40 714/15 |
| 2015/0074458 A1* | 3/2015 | Atluri | G06F 11/1453 714/19 |
| 2017/0351581 A1* | 12/2017 | Bakshan | G06F 11/1464 |
| 2020/0012570 A1* | 1/2020 | Singhal | G06F 11/0751 |

* cited by examiner

US 10,860,430 B2

SYSTEM AND METHOD FOR RESILIENT BACKUP GENERATION

BACKGROUND

Computing devices may include any number of internal components such as processors, memory, and persistent storage. Each of the internal components of a computing device may be used to generate data. The process of generating and storing data may utilize computing resources of the computing devices such as processing and storage.

SUMMARY

In one aspect, a computing device for storing backups of virtual machines in accordance with one or more embodiments of the invention includes a persistent storage and a backup manager. The persistent storage stores backup policies. The backup manager identifies an end of a backup generation session for a virtual machine of the virtual machines and, in response to identifying the end of the backup generation session, identifies a continuity chain implicated by the backup generation session using the backup policies; performs a membership analysis of the identified continuity chain to identify a continuity state of the continuity chain; makes a first determination that the identified continuity chain is broken based on the identified continuity state; and, in response to the first determination, remediates the continuity chain.

In one aspect, a method for storing backups of virtual machines in accordance with one or more embodiments of the invention includes identifying an end of a backup generation session for a virtual machine of the virtual machines and, in response to identifying the end of the backup generation session, identifying a continuity chain implicated by the backup generation session; performing a membership analysis of the identified continuity chain to identify a continuity state of the continuity chain; making a first determination that the identified continuity chain is broken based on the identified continuity state; and, in response to the first determination, remediating the continuity chain.

In one aspect, a non-transitory computer readable medium in accordance with one or more embodiments of the invention includes computer readable program code, which when executed by a computer processor enables the computer processor to perform a method for storing backups of virtual machines. The method includes identifying an end of a backup generation session for a virtual machine of the virtual machines and, in response to identifying the end of the backup generation session, identifying a continuity chain implicated by the backup generation session; performing a membership analysis of the identified continuity chain to identify a continuity state of the continuity chain; making a first determination that the identified continuity chain is broken based on the identified continuity state; and, in response to the first determination, remediating the continuity chain.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for improving the reliability of storing data for restoration purposes. The data may be, for example, a backup of a virtual machine, or a portion thereof, hosted by a host computing device. The backup may be used to restore the virtual machine to a predetermined state.

Embodiments of the invention may improve the reliability of storing data for restoration purposes by actively identifying data storage failures and remediating the failures. In one or more embodiments of the invention, data storage failures are identified by performing a membership analysis of a continuity chain associated with an entity. By performing a membership analysis of the continuity chain, data storage failures may be identified.

In one or more embodiments of the invention, identified data storage failures are remediated. By remediating the data storage failures, broken continuity chains may be repaired. Thus, embodiments of the invention may improve the reliability of storing data for restoration purposes by ensuring that continuity chains of backups are not broken by data storage failures. Doing may improve the reliability of computing devices, virtual machines, and other entities by ensuring that the entities may be restored to previous states even in the event of a data storage failure.

Figure 1:
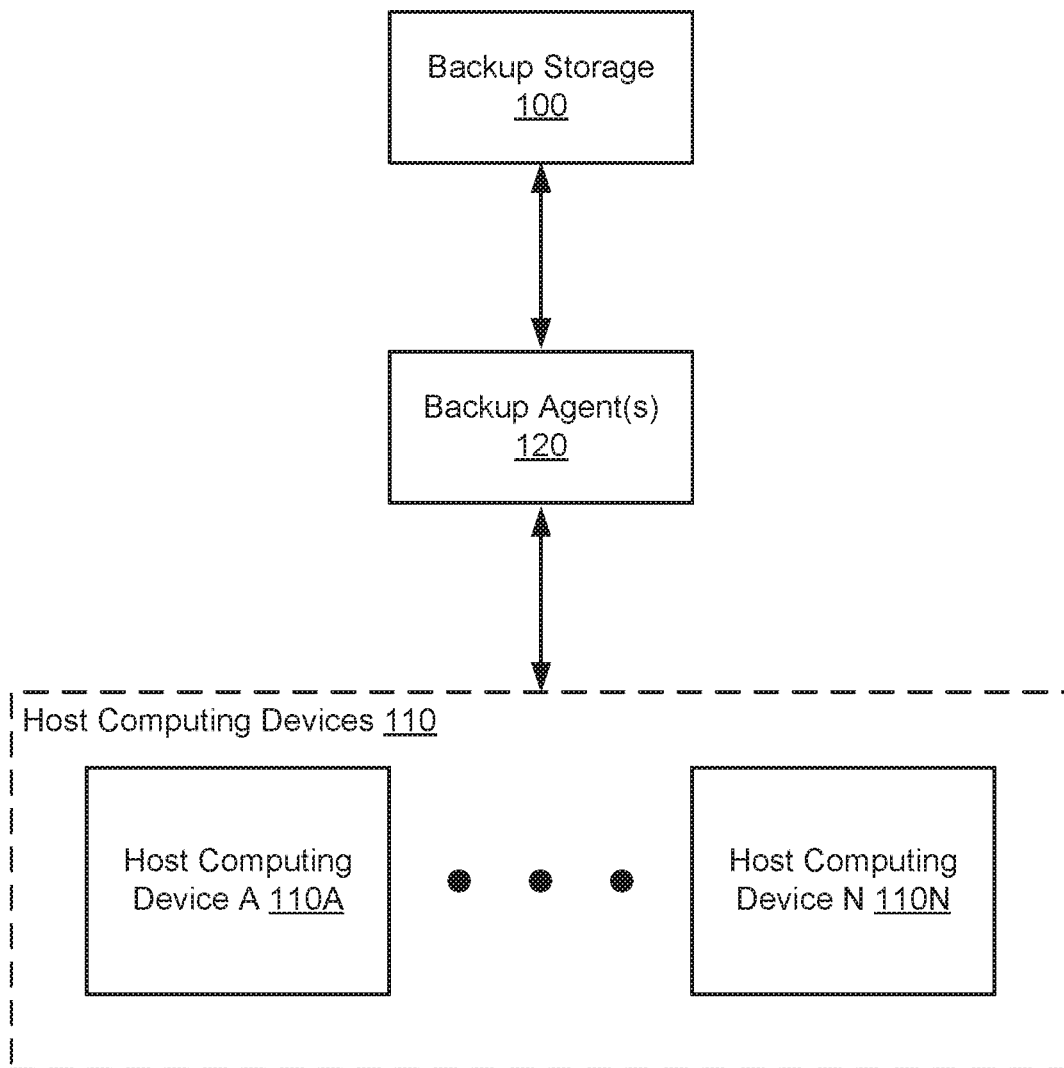
FIG. 1 shows a diagram of a system in accordance with one or more embodiments of the invention.

FIG. 1 shows a diagram of a system in accordance with one or more embodiments of the invention. The system may include one or more backup agents (120), a backup storage (100), and one or more host computing devices (110). Each of the components of the system may be operably connected to each other using any combination and quantity of wired and/or wireless networks. Each component of the system is discussed below.

In one or more embodiments of the invention, the backup storage (100) stores host computing device data and/or provides access to the stored host computing device data. The host computing device data may be, for example, backups of data stored in the host computing devices (110A, 110N). The backup storage (100) may obtain the backups from the backup agent(s) or from the host computing devices (110).

In one or more embodiments of the invention, the backup storage (100) is implemented as a computing device. The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup storage (100) described throughout this application and/or all, or a portion thereof, of the methods illustrated in FIGS. 5A-5C. For additional details regarding computing devices, See FIG. 7.

In one or more embodiments of the invention, the backup storage (100) is implemented as a logical device. The logical device may utilize the computing resources of any number of computing devices and thereby provide the functionality of the backup storage (100) described throughout this application and/or all, or a portion thereof, of the methods illustrated in FIGS. 5A-5C.

In one or more embodiments of the invention, the host computing devices (110A, 110N) store host computing device data in and/or retrieve stored host computing device data from the backup storage (100). The stored data may be, for example, a backup of the data stored in the host computing devices (110A, 110N).

In one or more embodiments of the invention, the host computing devices (110A, 110N) are implemented as computing devices. The computing devices may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the host computing devices (110A, 110N) described throughout this application and/or all, or a portion thereof, of the methods illustrated in FIGS. 5A-5C. For additional details regarding computing devices, See FIG. 7.

In one or more embodiments of the invention, the host computing devices (110A, 110N) are implemented as logical devices. A logical device may utilize the computing resources of any number of computing devices and thereby provide the functionality of the host computing devices (100A, 110N) and/or all, or a portion thereof, of the methods illustrated in FIGS. 5A-5C. For additional details regarding the host computing devices (110A, 110N), See FIG. 2B.

In one or more embodiments of the invention, the backup agent(s) (120) orchestrate the storage of data of the host computing devices (110) in the backup storage (100). The backup agent(s) (120) may orchestrate the storage of the data by scheduling when copies of data of the host computing devices (110A, 110N) are stored in the backup storage (100). The backup agents (120) may also specify whether all, or a predetermined portion, of data from the production hosts will be stored in the backup storage (100).

In addition to initiating the storage of data from the host computing devices (110A, 110N), the backup agent(s) (120) may also verify that the data has been stored in the backup storage (100). If the data has not been stored, the backup agent(s) (120) may perform a remediation to ensure that the storage failure does not impact the ability of the system to perform a restoration using the aforementioned data.

For example, due to unexpected power failures or other unpredictable events, data from the host computing devices (110) may not be stored in the backup storage (100) even though it was scheduled to be stored. Other events such as network failures or miscommunication may also cause the data from the host computing devices to not be stored in the backup storage. In such a scenario, the backup agent(s) (120) may detect the data storage failure and take action to ensure that the host computing device, from which the data was to be stored, may be restored to a previous state associated with the data. As will be discussed in greater detail below, a continuity chain analysis of previously stored data may be performed to both detect the data storage failure and determine a course of action to remediate the failure.

In one or more embodiments of the invention, the backup agent(s) (120) are implemented as computing devices. A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup agent(s) (120) described throughout this application and/or all, or a portion thereof, of the methods illustrated in FIGS. 5A-5C. For additional details regarding computing devices, See FIG. 7.

In one or more embodiments of the invention, the backup agent(s) (120) are implemented as a logical device. The logical device may utilize the computing resources of any number of computing devices and thereby provide the functionality of the backup manager (120) described throughout this application and/or all, or a portion thereof, of the methods illustrated in FIGS. 5A-5C. For additional details regarding the backup agent(s) (120), See FIG. 2A.

While the system of FIG. 1 has been illustrated as including a limited number of components for the sake of brevity, the system may include additional components (not shown), fewer components, and/or different components (not shown) without departing from the invention. For example, the system may include multiple backup storages and/or multiple backup agents that each interact with different subsets of the host computing devices (110) or all of the host computing devices (110).

Figure 2A:
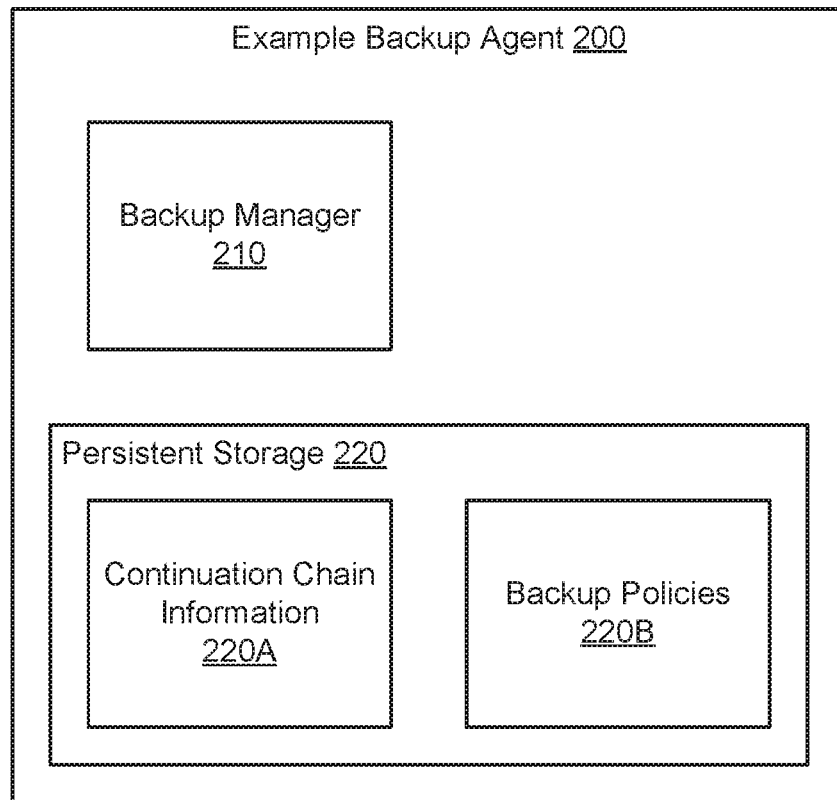
FIG. 2A shows a diagram of an example backup agent n accordance with one or more embodiments of the invention.

FIG. 2A shows a diagram of an example backup agent (200) in accordance with one or more embodiments of the invention. The example backup agent (200) may be similar to the backup agent(s) (120. FIG. 1) discussed above. As discussed above, the example backup agent (200) may orchestrate the storage of data, e.g., backups of host computing devices, in a backup storage. To provide the aforementioned functionality, the example backup agent (200) may include a backup manager (210) and a persistent storage (220). The persistent storage (220) may store data structures utilized by the backup manager (210). Each component of the example backup agent (200) is discussed below.

In one or more embodiments of the invention, the backup manager (210) orchestrates the storage of data from host computing devices in backup storage, verifies that the data has been stored in backup storage, and, when the data has not been stored, performs a remediation to ensure that the host computing device from which the data was not stored can be restored to a previous state associated with the data using other data than that which was not stored.

To orchestrate storage of the data from the host computing devices, the backup manager (210) may initiate storage of the data. The backup manger (210) may initiate storage of data as specified by backup policies (220B) stored in the persistent storage (220B). For additional details regarding backup policies, See FIG. 3A.

After initiating storage of the data, the backup manager (210) may verify that the data was stored in the backup storage. Failure to store the data in the backup storage may prevent a host computing device from being restored. As will be discussed in greater detail below, multiple portions of data stored in the backup storage from a host computing device may be required to perform a restoration of the host computing device. Thus, if a single portion of the data fails to be stored in backup storage, it may render all, or a portion, of the stored portions of the data to be unusable for restoration purposes. For additional details regarding using multiple portions of data from host computing devices for restoration purposes, See FIG. 3B.

In one or more embodiments of the invention, the backup manager (210) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup manager (210) described throughout this application and/or all or a portion of the methods illustrated in FIGS. 5A-5C.

Figure 5A:
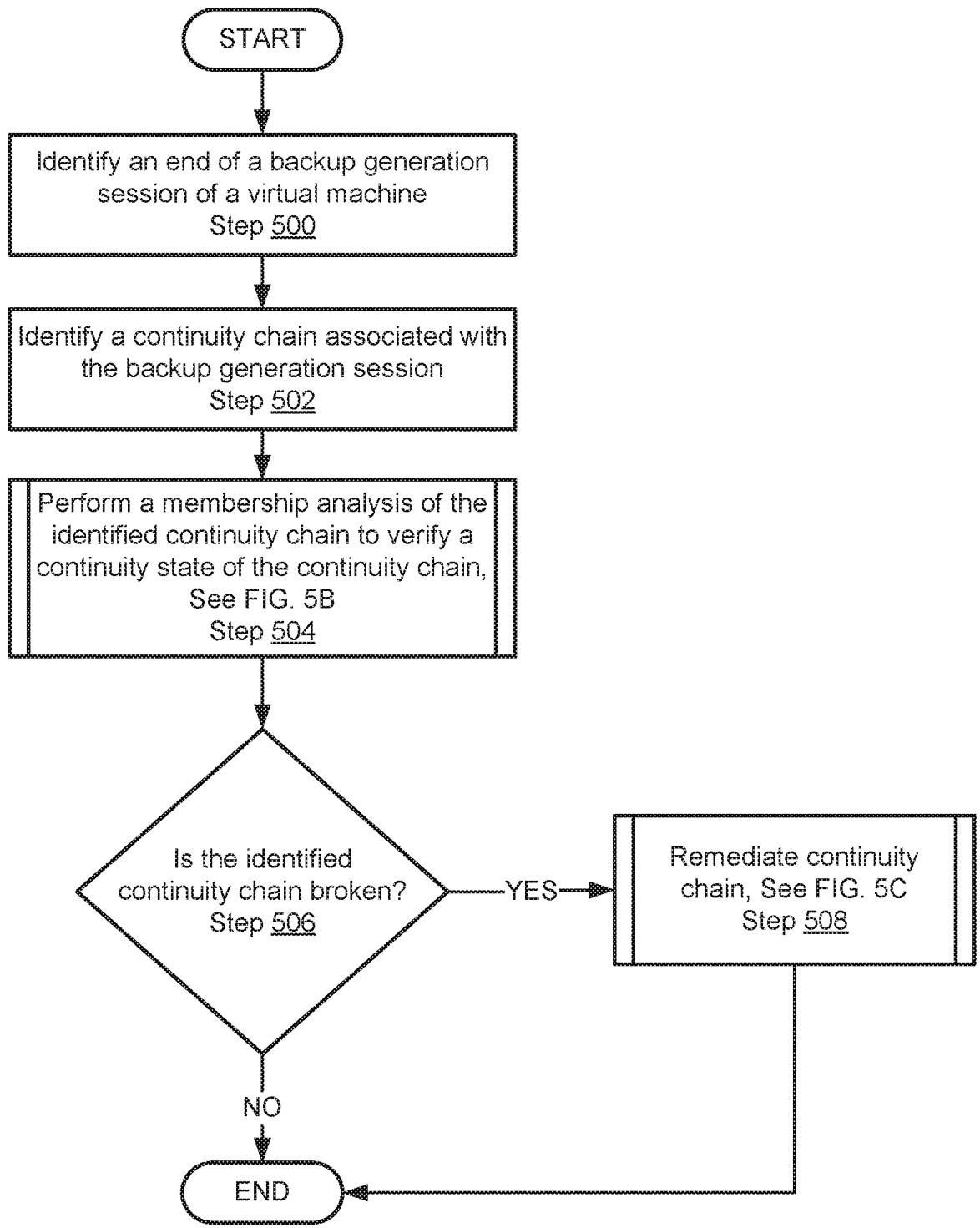
FIG. 5A shows a flowchart of a method for monitoring backups in a backup storage in accordance with one or more embodiments of the invention.
Figure 5B:
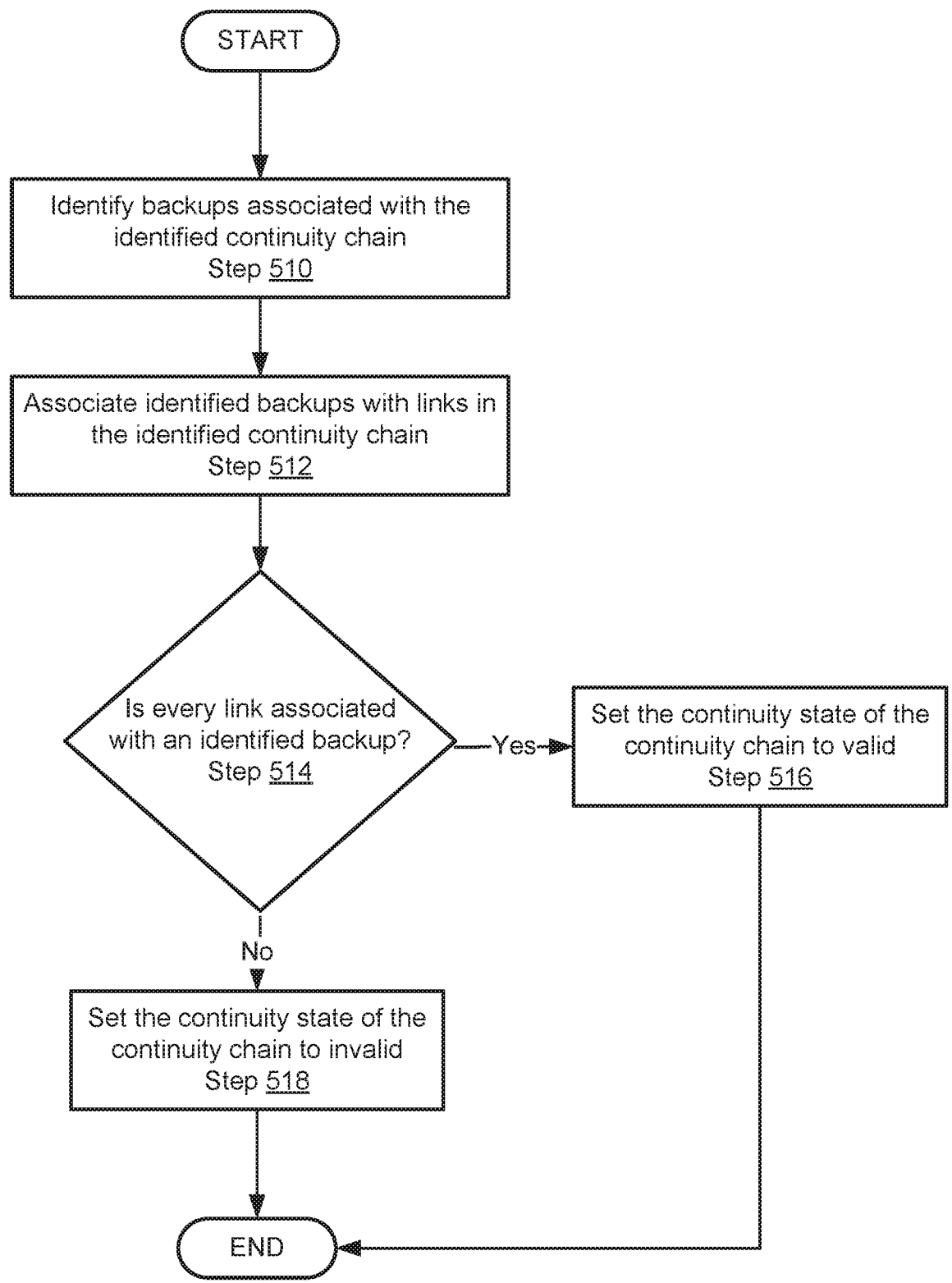
FIG. 5B shows a flowchart of a method for performing a membership analysis in accordance with one or more embodiments of the invention.
Figure 5C:
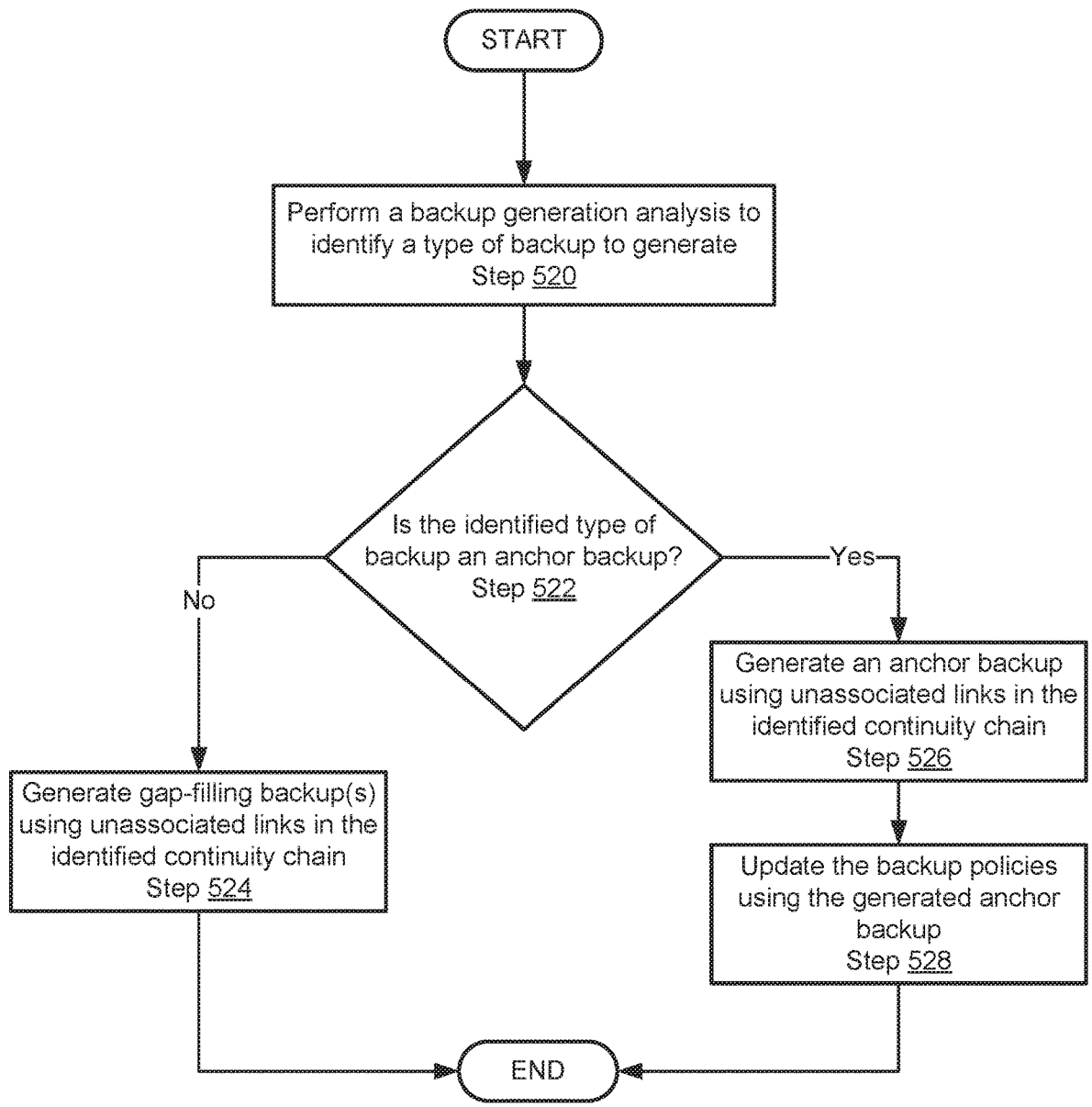
FIG. 5C shows a flowchart of a method for performing remediation actions in accordance with one or more embodiments of the invention.

In one or more embodiments of the invention, the backup manager (210) is implemented as computer instructions (e.g. computer code) stored on a persistent storage that when executed by a processor of the example backup manager (200) cause the example backup agent (200) to provide the functionality of the backup manager (210) described throughout this application and/or all or a portion of the methods illustrated in FIGS. 5A-5C.

As discussed above, the backup manager (210) may use data structures stored in the persistent storage (220) when determining whether data has been properly stored in backup storage. In one or more embodiments of the invention, the persistent storage (220) stores data structures and may be, for example, hard disk drives, solid state drives, tape drives, or any combination thereof. The persistent storage (220) may be other types of digital storage without departing from the invention. The persistent storage (220) may be a virtualized storage without departing from the invention.

The persistent storage (220) may store continuity chain information (220A) and backup policies (220A). The persistent storage (220) may include additional, fewer, and/or different data structures without departing from the invention. Each of the aforementioned data structures is discussed below.

The continuity chain information (220A) may be a data structure that specifies backups that are expected to be generated and any interdependencies between the expected to be generated backups. The to-be-generated backups may be copies of portions of data from host computing devices. Interdependence between the backups may be, for example, the necessity of the existence of another backup for a particular backup to be used for restoration purposes. For additional details regarding interdependence of backups, See FIGS. 3A-3B.

The continuity chain information (220A) may be based on the backup policies (220B). In other words, the information included in the backup policies (220B) may be derived from information stored in the backup policies (220B). For example, multiple policies of the backup policies (220B) may be associated with each other and, consequently, indicate that the data the aforementioned policies require to be stored in backup storage is interdependent.

The continuity chain information may be used by the backup manager (210) to identify data storage failures in backup storage. For example, if data from a host computing device specified by the continuity chain information for storage is not present in backup storage, the lack of the data may indicate a storage failure. For additional details regarding the continuity chain information (220A) and its use for restoration purposes, See FIG. 3B.

The backup policies (220B) may be data structures that specify when copies of data from host computing devices are stored in a backup storage. For example, the backup policies (220B) may specify a host computing device from which the data originates, a frequency in which the client data is to be stored, and a storage location for storage of the client data. For additional details regarding the backup policies (220B), See FIG. 3A.

Figure 2B:
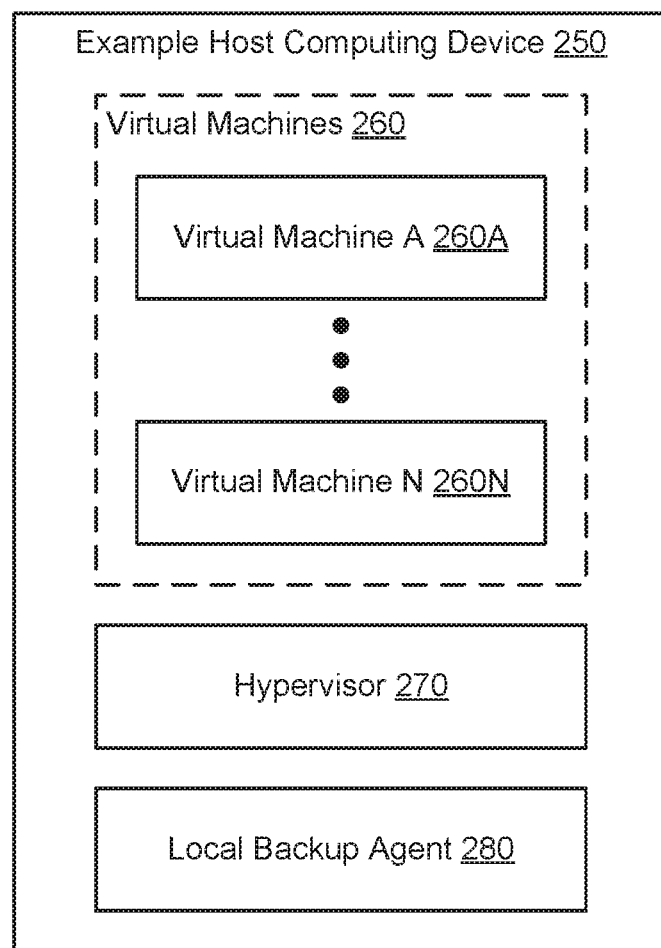
FIG. 2B shows a diagram of an example host computing device in accordance with one or more embodiments of the invention.

As discussed above, a backup agent may store data from host computing devices. FIG. 2B shows a diagram of an example host computing device (250) in accordance with one or more embodiments of the invention. The example host computing device (250) may be similar to the host computing devices (110A, 110N) discussed above.

In one or more embodiments of the invention, the example host computing device (250) hosts virtual machines (260). The virtual machines (260) may be logical entities executed using computing resources of the example host computing device (250) and/or other computing devices. Each of the virtual machines (260A, 260N) may be performing similar or different processes. In one or more embodiments of the invention, the virtual machines (260)

provide services to users, e.g., clients (not shown). For example, the virtual machines (260) may host instances of databases, email servers, and/or other applications. The virtual machines (260) may host other types of applications without departing from the invention.

In one or more of embodiments of the invention, the virtual machines (260A, 260N) are implemented as computer instructions, e.g., computer code, stored on a persistent storage that when executed by a processor of the example host computing device (250) cause the example host computing device (250) to provide the functionality of the virtual machines (260A, 260N) described throughout the application and/or all or a portion of the methods illustrated in FIGS. 5A-5C.

In one or more embodiments of the invention, the example host computing device (250) includes a hypervisor (270) that orchestrates the operation of the virtual machines (260). The hypervisor (270) may orchestrate the operation of the virtual machines (260A, 260N) by allocating computing resources to each virtual machine. In one or more embodiments of the invention, the hypervisor (270) orchestrates the operation of the virtual machines (260) by storing backups of the virtual machines in a backup storage and/or performing restorations of the virtual machines using backups stored in the backup storage.

In one or more embodiments of the invention, the hypervisor (270) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the hypervisor (270) described throughout this application and/or all or a portion of the methods illustrated in FIGS. 5A-5C.

In one or more embodiments of the invention, the hypervisor (270) is implemented as computer instructions, e.g., computer code, stored on a persistent storage that when executed by a processor of the example host computing device (250) cause the example host computing device (250) to provide the functionality of the hypervisor (270) described throughout the application and/or all or a portion of the methods illustrated in FIGS. 5A-5C.

In one or more embodiments of the invention, the example host computing device (250) includes a local backup agent (280) that stores backups of the virtual machines (260) in a backup storage and/or performs restorations of the virtual machines using backups stored in the backup storage.

In one or more embodiments of the invention, the local backup agent (280) is a hardened entity, i.e., not modifiable by an entity that is remote to the example host computing device (250) on which the local backup agent (230) is executing. The local backup agent (280) may have a set, finite number of predefined functions that may be invoked by a remote entity. In one or more embodiments of the invention, the local backup agent (280) is not configurable by modifying settings or associated configuration files by a remote entity.

In one or more embodiments of the invention, the local backup agent (280) is implemented as computer instructions, e.g., computer code, stored on a persistent storage that when executed by a processor of the example host computing device (250) cause the example host computing device (250) to provide the functionality of the local backup agent (180) described throughout the application and/or a portion of the methods illustrated in FIGS. 5A-5C.

In one or more embodiments of the invention, the local backup agent (280) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the local backup agent (280) described throughout this application and/or all or a portion of the methods illustrated in FIGS. 5A-5C.

Figure 3A:
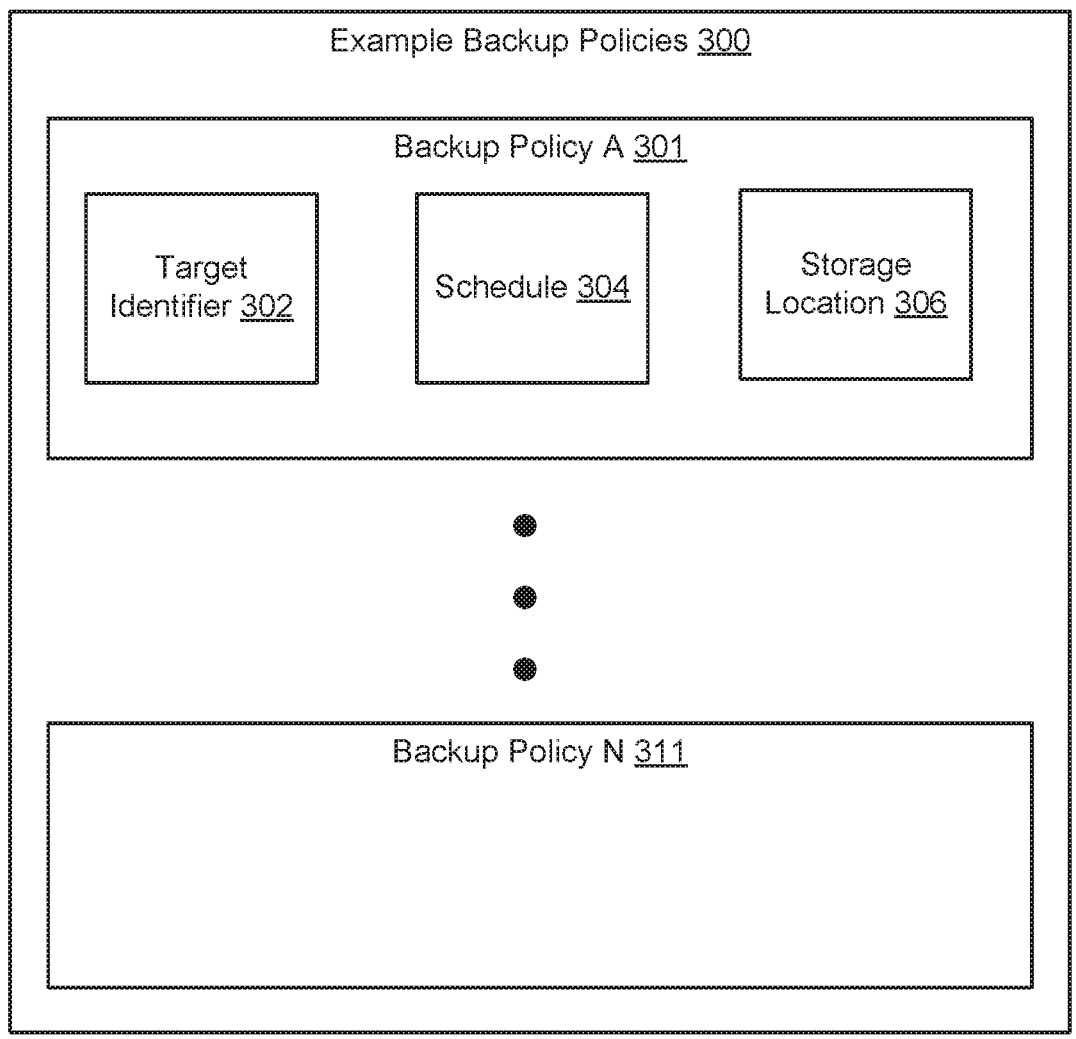
FIG. 3A shows a diagram of example backup policies in accordance with one or more embodiments of the invention.

As discussed above, a backup agent may use backup policies for storing data from host computing devices. FIG. 3A shows a diagram of example backup policies (300) in accordance with one or more embodiments of the invention. The example backup policies (300) may be similar to the backup policies (220B) discussed above. As discussed above, the example backup policies (300) may specify when copies of data from the host computing devices are stored in the backup storage.

The example backup policies (300) may include any number of backup policies (301, 311). Each backup policy (301, 311) may include a target identifier (302), a schedule (304), and a storage location (306). The backup policies (301, 311) may include other information without departing from the invention. Each portion of the example backup policies (300) is discussed below.

In one or more embodiments of the invention, the target identifier (302) specifies entities of the system of FIG. 1. The entities may be, for example, computing devices, virtual machines, and/or other entities without departing from the invention. The target identifier (302) may be, for example, uniform resource identifiers (URI) that discriminate those entities specified by the target identifier (302) from all other entities of the system of FIG. 1. The target identifier (302) may be other types of identifiers without departing from the invention. When identified by the target identifier (302), backups of the identified entities may be generated in accordance with the schedule (304) and storage location (306) discussed below.

The target identifier (302) may specify only a portion of the data of an entity at any level of granularity without departing from the invention. For example, the target identifier (302) may include a URI and one or more identifiers of resources of the entity identified by the URI. In such a scenario, only the resources of the entity specified by the URI may be scheduled for backup via the backup policy. Other systems for identifying entities and/or resources of entities may be used without departing from the invention.

In one or more embodiments of the invention, the schedule (304) specifies when a backup is to be generated. The schedule (304) may be a frequency at which a backup is generated. For example, a schedule (304) may specify that a backup be generated on a daily basis. The schedule (304) may specify when backups are generated using different metrics without departing from the invention.

In one or more embodiments of the invention, the storage location (306) specifies where the backup is stored. The backup may be stored, for example, in a backup storage. The storage location (306) may be, for example, an URI that specifies the backup storage, or a portion thereof.

Figure 3B:
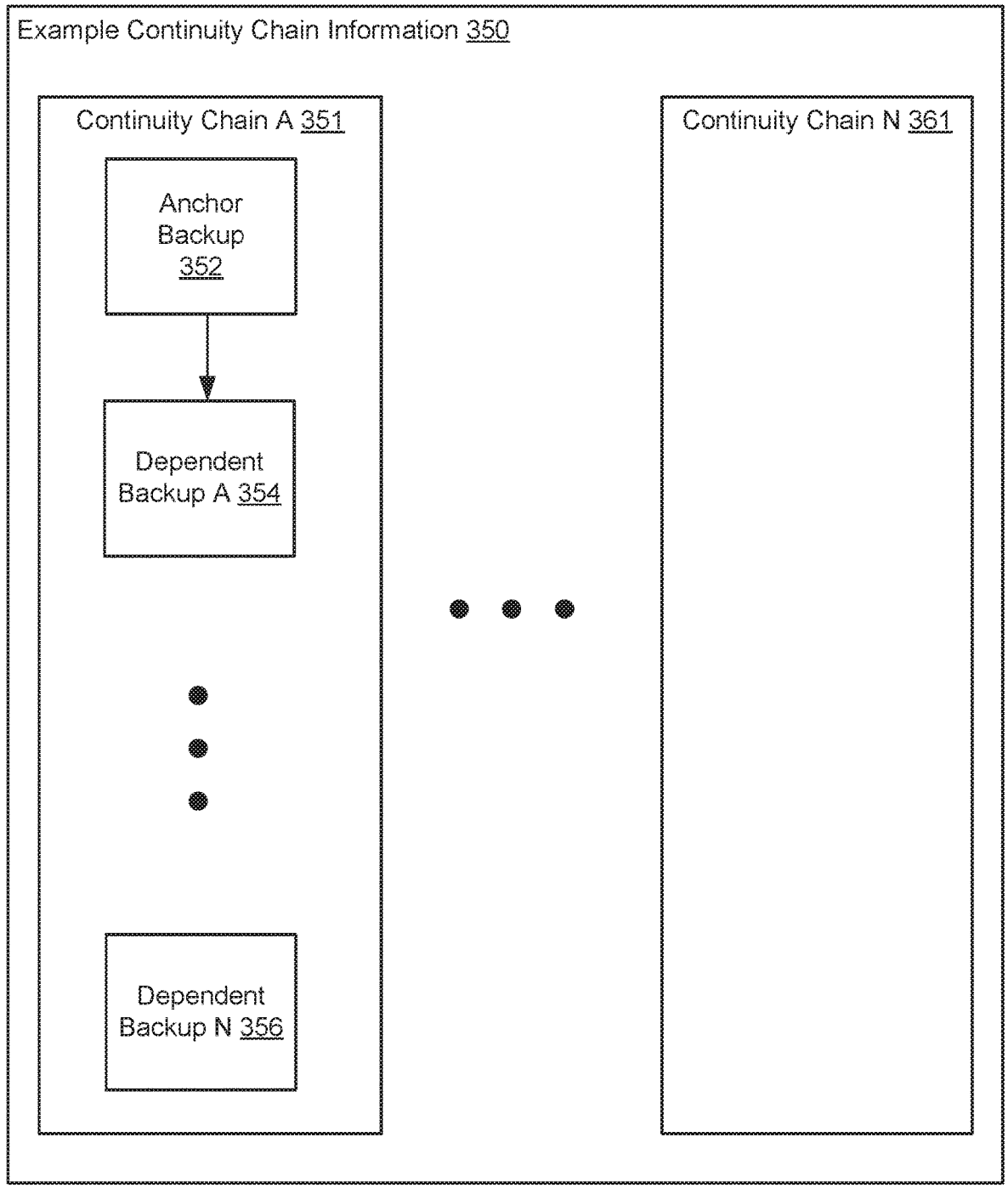
FIG. 3B shows a diagram of an example continuity chain information in accordance with one or more embodiments of the invention.

FIG. 3B shows example continuity chain information (350) in accordance with one or more embodiments of the invention. The example continuity chain information (350) may be similar to the continuity chain information (220A, FIG. 2A) discussed above. As discussed above, the example continuity chain information (350) may be a data structure that specifies a prediction of expected backups, e.g., copies of portions of data of virtual machines at predetermined points in time, and the interdependencies of the backups of the continuity chain. The expected backups may be identified using backup policies of a backup agent. For example, to-be-stored backups may be predicted based on a schedule of a backup policy.

The continuity chain information (350) may include any number of continuity chains (351, 361). Each continuity chain may be associated with an entity, e.g., a virtual machine, an application executing on a virtual machine, etc.

In one or more embodiments of the invention, each continuity chain (351, 363) includes a number of backups (e.g., 352-356) that may be used to restore the entity associated with the respective continuity chain to different states associated with points in time in the past. For example, each backup may be associated with different points in time in the past. When a continuity chain is continuous, the entity associated with the continuity chain may be restored to any of its previous states at the times associated with the backups of the continuity chain. However, when a continuity chain is discontinuous, it may not be possible to perform a restoration of an entity associated with the continuity chain to all of the prior states associated with the backups.

In one or more embodiments of the invention, there are two classes of backups: independent backups and dependent backups. Entities may be restored to a previous state associated with any independent backup using only the independent backup. In contrast, dependent backups may only be used in combination with at least one independent backup to restore an entity to a state associated with the dependent backup.

For example, with respect to FIG. 3B, an entity associated with continuity chain A (351) may be restored to a state associated with anchor backup (352), an independent backup, without using any of the dependent backups (354, 356). In contrast, to restore the entity associated with continuity chain A (351) to a second state associated with dependent backup B (354), a dependent backup, the anchor backup (352) and dependent backup A (354) must both be used. Further, to restore the associated entity to a third state associated with dependent backup N (356), the anchor backup (352), dependent backup A (354), the dependent backup N (356), and all intervening backups must be used.

Figure 4:
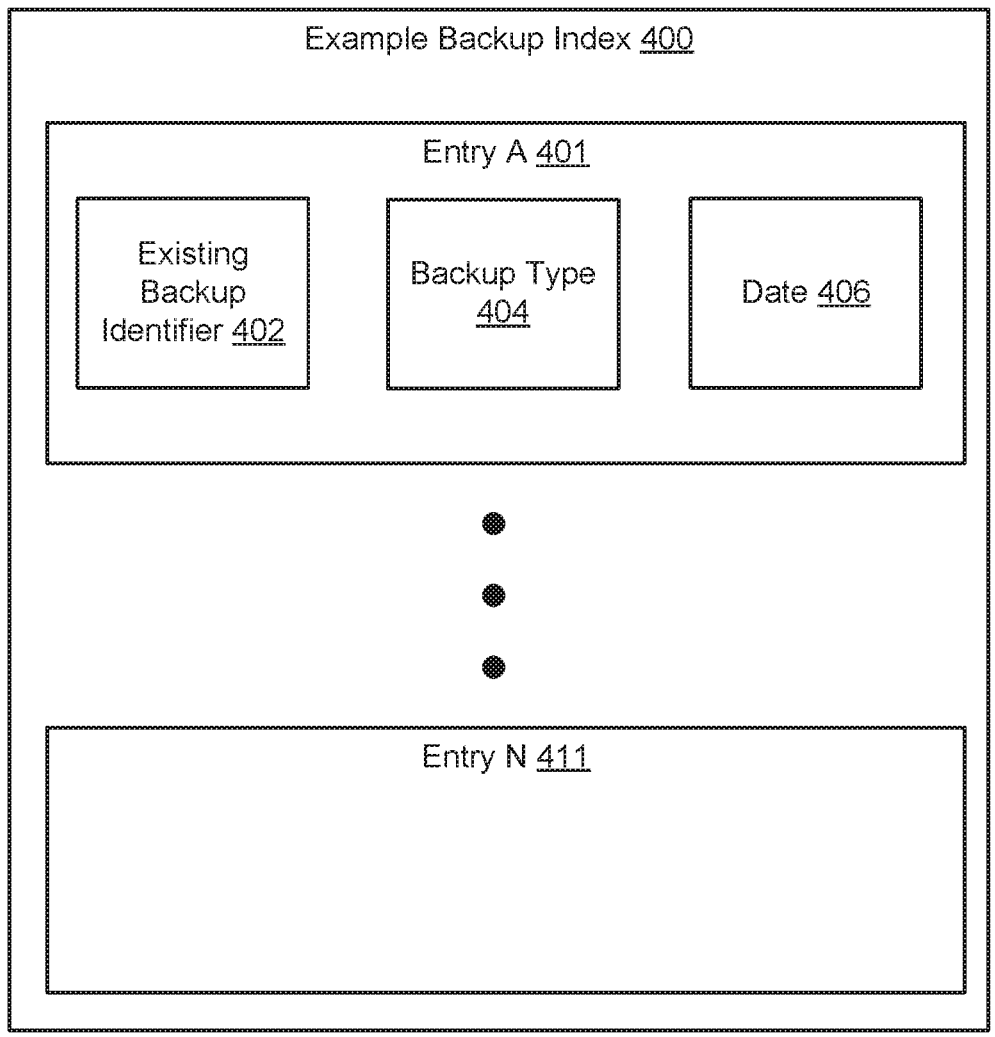
FIG. 4 shows a diagram of an example backup index in accordance with one or more embodiments of the invention.

As discussed above, a backup agent may perform a continuity chain analysis. The backup agent may compare continuity chain information to backups in a backup storage. In one or more embodiments of the invention, the backup agent generates a backup index to perform the aforementioned functionality. FIG. 4 shows an example backup index in accordance with one or more embodiments of the invention. The example backup index may be an in-memory data structure. The example backup index (400) may include information regarding backups stored in a backup storage. In other words, the example backup index (400) may enable a backup agent to analyze the existing set of backups on a backup storage without accessing the backup storage.

The example backup index (400) may include any number of entries (401, 411) each corresponding to a backup in the backup storage. Each entry may include an existing backup identifier (402) that identifies the corresponding backup, a backup type (404) that identifies the type of backup (e.g., independent or dependent; more granular identification schemes may be used), and a date (406) that reflects a point in time associated with the backup.

While the data structure of FIG. 4 has been illustrated as a separate data structure, the aforementioned data structure may be combined with other data without departing from the invention. Additionally, while the aforementioned data structure is discussed as being stored on the example backup agent (200, FIG. 2A), the data structure may be stored on other devices without departing from the invention.

Additionally, while the data structure illustrated in FIG. 4 is shown as a list of entries, the data structure may be stored in other formats, may be divided into multiple data structures, and/or portion of the data structures may be distributed across multiple computing devices without departing from the invention.

As discussed above, components of the system of FIG. 1 may perform methods of storing, verifying, and remediating the failed storage of data from host computing devices. FIGS. 5A-5C show methods in accordance with one or more embodiments of the invention that may be performed by components of the system of FIG. 1 to facilitate portions of the aforementioned functionality.

FIG. 5A shows a flowchart of a method in accordance with one or more embodiments of the invention. The method depicted in FIG. 5A may be used to remediate data storage failures in accordance with one or more embodiments of the invention. The method shown in FIG. 5A may be performed by, for example, backup agents (120, FIG. 1). Other components of the system illustrated in FIG. 1 may perform the method of FIG. 5A without departing from the invention.

In Step 500, an end of a backup generation session of a virtual machine is identified.

In one or more embodiments of the invention, the backup agent identifies the end of the backup generation session using a backup policy. The end of a backup generation session may be specified by a schedule of a backup policy. The backup agent may identify the end of the backup generation session by monitoring the schedule of the backup policy and matching a current time to a time period in which the schedule specifies that a backup is to be generated.

In Step 502, a continuity chain associated with the backup generation session is identified.

In one or more embodiments of the invention, the backup agent identifies a backup policy that triggers the backup generation session. The backup policy may be associated with a target entity identified by a target identifier of the backup policy. The backup agent may identify an entity associated with the backup policy. The continuity chain may be identified by matching the identified entity to an associated continuity chain. The continuity chain may be identified from continuity chain information stored in the backup agent.

In Step 504, a membership analysis of the identified continuity chain is performed to verify a continuity state of the continuity chain.

In one or more embodiments of the invention, the membership analysis is a method for determining whether all backups in a continuity chain have been generated and exist in a backup storage. The membership analysis may be performed by identifying backups in a backup storage and matching the identified backups to backups of the continuity chain. The backup agent may determine whether all backups of the continuity chain are matched to an identified backup. The backup agent may set the continuity state of the continuity chain according to whether all backups of the continuity chain are matched.

In one or more embodiments of the invention, backup policies are interrogated to identify the backups that should be generated as part of the continuity chain. For example, all backup policies associated with the continuity chain, e.g., associated with an entity such as a virtual machine that is associated with the continuity chain, may be analyzed to determine the backups that should be present in the backup storage as part of the continuity chain.

In one or more embodiments of the invention, a continuity chain is set to a broken continuity state if not all backups from the continuity chain exist in a backup storage at the time the membership analysis is performed.

In one or more embodiments of the invention, a membership analysis is performed via the method illustrated in FIG. 5B. A membership analysis may be performed via other methods without departing from the invention.

In Step 506, it is determined whether the identified continuity chain is broken. If the continuity chain is broken, the method may proceed to Step 508. If the continuity chain is not broken, the method may end following Step 506.

In Step 508, the identified continuity chain is remediated.

In one or more embodiments of the invention, the identified continuity chain is remediated, in part, by performing an unscheduled backup generation to replace a to-be-stored backup that was not stored in backup storage.

In one or more embodiments of the invention, the identified continuity chain is remediated via the method illustrated in FIG. 5C. The identified continuity chain may be remediated via other methods without departing from the invention.

The method may end following Step 508.

FIG. 5B shows a flowchart of a method in accordance with one or more embodiments of the invention. The method depicted in FIG. 5B may be used to perform a membership analysis of an identified continuity chain in accordance with one or more embodiments of the invention. The method shown in FIG. 5B may be used by, for example, a backup agent (120, FIG. 1). Other components of the system illustrated in FIG. 1 may perform the method of FIG. 5B without departing from the invention.

In Step 510, backups associated with the identified continuity chain are identified.

In one or more embodiments of the invention, the backups are identified from a backup storage. A backup agent may identify all backups in a backup storage that are associated with an entity, e.g., a virtual machine, that is associated with the identified continuity chain.

In one or more embodiments of the invention, the backups are identified using a backup index. The backup index may include all backups in a backup storage. A backup agent may identify backups in a backup index that correspond to backups associated with the identified target entity of FIG. 5A. The backup agent may use the backup index to identify the expected backup associated with the backup generation session of FIG. 5A and all backups interdependent on the expected backup.

In Step 512, the identified backups are associated with links in the identified continuity chain.

In one or more embodiments of the invention, each link represents a predicted backup, e.g. a backup that should be present because of a corresponding backup policy. The links may be associated to the identified backups by matching backup identifiers of the identified backups to backups of a link in the continuity chain.

In Step 514, it is determined whether every link in the identified continuity chain is associated to an identified backup. If every link is associated to an identified backup, the method may proceed to Step 516. If not every link is associated to an identified backup, the method may proceed to Step 518.

In Step 516, the continuity state of the continuity chain is set to valid.

In one or more embodiments of the invention, a valid continuity chain is a continuity chain that is not broken. In other words, a valid continuity chain having all of its links be associated with existing backups in a backup storage. A backup agent may assign the continuity chain a continuity state of not broken.

The method may end following Step 516.

In Step 518, the continuity state of the continuity chain is set to invalid.

In one or more embodiments of the invention, an invalid continuity chain is a continuity chain that is broken. In other words, one or more links an invalid continuity chain are not associated with an existing backup in a backup storage. The backup agent may assign the continuity chain a continuity state of broken.

The method may end following Step 518.

FIG. 5C shows a flowchart of a method in accordance with one or more embodiments of the invention. The method depicted in FIG. 5C may be used to perform remediation actions in accordance with one or more embodiments of the invention. The method shown in FIG. 5C may be performed by, for example, a backup agent (120, FIG. 1). Other components of the system illustrated in FIG. 1 may perform the method of FIG. 5C without departing from the invention.

In Step 520, a backup generation analysis is performed to identify a type of backup to generate.

In one or more embodiments of the invention, a backup generation analysis is a method for determining a type of backup to generate. The backup generation analysis may include identifying factors such as available computing resources (i.e. storage availability of the backup storage and/or processing capability of a computing device performing the backup generation) and/or the number of unassociated links. Other factors may be used when performing the backup generation analysis without departing from the invention.

In one or more embodiments of the invention, available storage is used to determine the type of backup to generate. Low storage may prompt the backup agent performing the backup generation analysis to determine a dependent backup as the backup type. Dependent backups may take up less space than other backups (i.e. anchor backups). Therefore, a backup agent may identify the type of backup as dependent if there is low available storage. A low-storage threshold may be used to determine whether available storage in a backup storage is low.

In one or more embodiments of the invention, the processing capability of a computing device performing the backup generation may determine the type of backup generated. The generation of a backup may require processing power. An anchor backup with more data may require more processing than a dependent backup. Therefore, the backup agent may identify the type of backup as dependent if there is low processing availability of the computing device.

In one or more embodiments of the invention, the number of unassociated links may determine the type of backup to generate. An unassociated link may be a link in the identified continuation chain that does not have an associated identified backup. The backup agent may determine the type of backup to be an anchor backup if the number of unassociated links is large and may prompt the generation of a single anchor backup. In one or more embodiments of the invention, a dependent backup corresponding to each unassociated link is generated. Generating multiple dependent backups may be more computationally expensive than generating a single anchor backup. Therefore, the backup agent may identify the type of backup as an anchor backup if there is a large number of unassociated links.

In Step 522, it is determined if the identified type of backup is an anchor backup. If the identified backup is not an anchor backup, the method may proceed to Step 524. If the identified type of backup is an anchor backup, the method may proceed to Step 526.

In Step 524, one or more gap-filling backups are generated using unassociated links in the identified continuity chain.

In one or more embodiments of the invention, a gap-filling backup is a backup replacing a predicted backup of an unassociated link. The target entity of FIG. 5A may generate the gap-filling backup(s). The gap-filling backup(s) may be generated by identifying the unassociated links in the identified continuity chain, identify a to-be-generated backup for each identified unassociated link, and generating backups according to the identified to-be-generated backups.

The method may end following Step 524.

In Step 526, an anchor backup is generated using unassociated links in the identified continuation chain.

In one or more embodiments of the invention, an anchor backup is generated to replace one or more predicted backups of unassociated links. A backup agent may generate an anchor backup by identifying an unassociated link in the continuity chain that does not depend on another unassociated link, identifying a to-be-generated backup corresponding to the identified unassociated link, and generating a backup according to the to-be-generated backup.

In Step 528, backup policies are updated using the generated anchor backup.

In one or more embodiments of the invention, the backup policies are updated to recognize the generated anchor backup. The backup policies may be updated by generating additional backup policies. The additional backup policies may specify a schedule and target identifier according to the generated anchor backup.

In one or more embodiments of the invention, the backup policies are updated to specify the removal of backups dependent on non-existing backups. The backup agent may identify backups in the backup storage corresponding to links that depend on unassociated links in the continuity chain. The identified backups may not be useful because they depend on backups that were not generated. The backup agent may remove the identified backups from the backup storage by deleting the identified backups.

The method may end following Step 528.

Figure 6A:
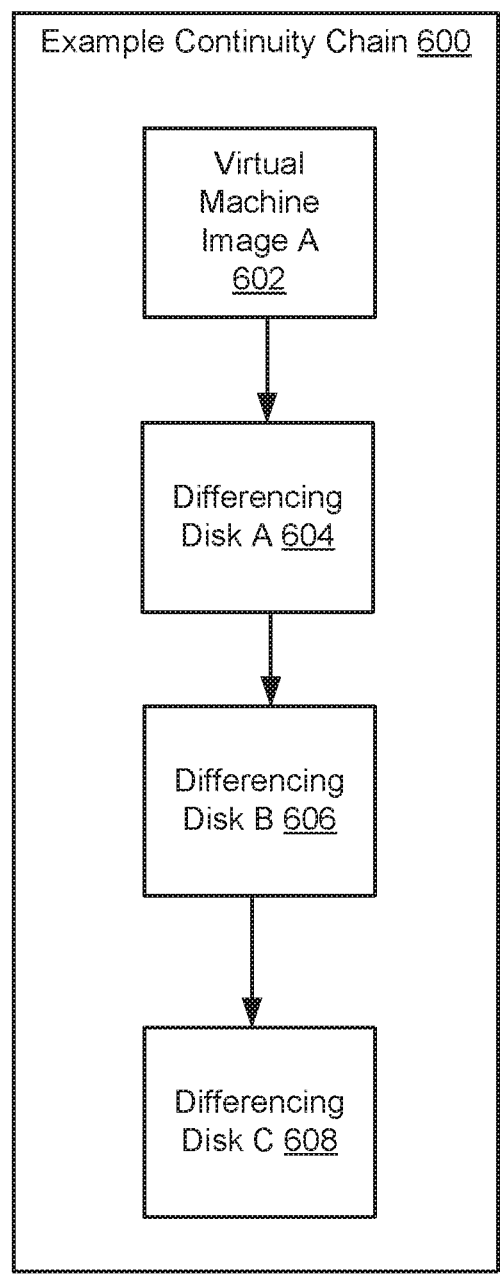
FIG. 6A shows a diagram of an example dependency graph.
Figure 6B:
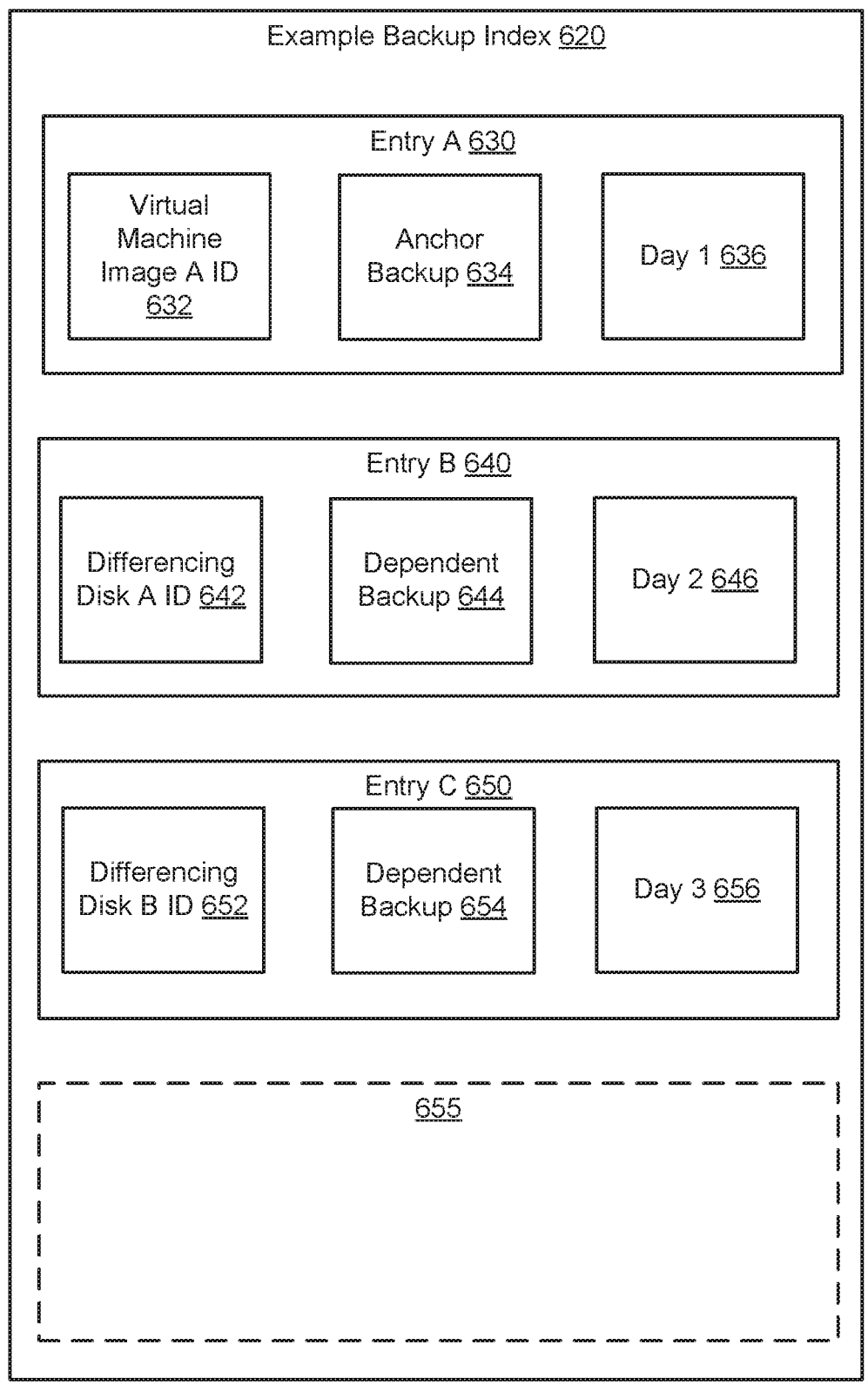
FIG. 6B shows a diagram of an example backup index.
Figure 6C:
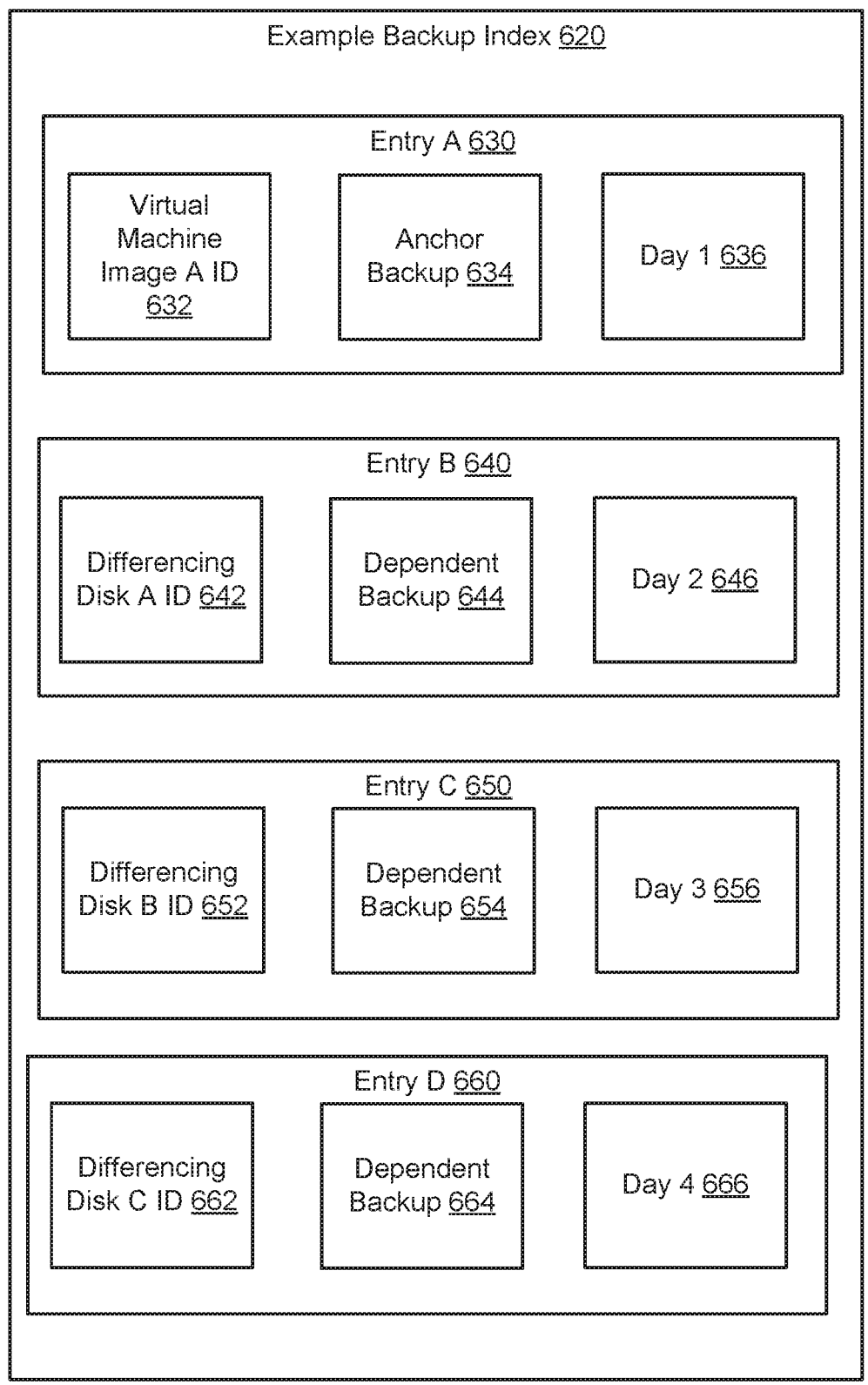
FIG. 6C shows a diagram of the example backup index of FIG. 6B.

To further clarify aspect of the invention, a non-limiting example is provided in FIGS. 6A-6C.

Example 1

Consider a scenario in which a backup generation session has taken place, and a backup agent has identified the end of the backup generation session. The backup generation session may be a scheduled generation of a differencing disk of a virtual machine as specified by a backup policy. In response to the end of the backup generation session, the backup agent may generate a continuity chain associated with the differencing disk.

FIG. 6A shows a diagram of an example continuity chain (600). The example continuity chain (600) may include links (602, 604, 606, 608) that correspond to backups scheduled to have been generated. The example continuity chain (600) may be generated by identifying the scheduled backup of the backup generation session. The scheduled backup may be differencing disk C (608). The backup agent (not shown) may identify backups that depend on and/or are depended on by differencing disk C (608). Differencing disk B (606) may be depended on by differencing disk C (606). Additionally, the backup agent may identify backups depended on by differencing disk B and continue identifying dependent backups until an anchor backup is identified. Virtual machine image A (602) may be the identified anchor backup. Differencing disk A (604) may be dependent on virtual machine image A (602).

The backup agent may identify existing backups associated with the example continuity chain (600). The backup agent may use a backup index to identify the existing backups. FIG. 6B shows a diagram of an example backup index (620). The example backup index (620) may include entries (630, 640, 650) each corresponding to an identified existing backup in a backup storage (not shown). Entry A (630) may correspond to virtual machine image A (602, FIG. 6A), entry B (640) may correspond to differencing disk A (604, FIG. 6A), and entry C (650) may correspond to differencing disk B (606, FIG. 6A). Each entry (630, 640, 650) may have a corresponding identifier (632, 642, 652), a backup type identifier (634, 644, 654), and a date (636, 646, 656) in which the corresponding backup was generated.

Each identified backup may be associated with a link in the example continuity chain (600). The backup agent may determine that not all links in the example continuity chain (600) are associated with an identified backup. Differencing disk C (608, FIG. 6A) may be an unassociated link. A gap (655) may be illustrated to represent an expected backup (i.e. differencing disk C) that was not generated.

The backup agent may perform a backup generation analysis to determine the type of backup to generate to replace the gap (655). The backup agent may determine that the available computational resources provide low available storage. Therefore, the type of backup may not be an anchor backup. The backup agent may orchestrate the generation of a dependent backup. The dependent backup may replace the gap (655) in the example backup index (620).

FIG. 6C shows a diagram of the example backup index (620) with an additional entry (660) representing the generated backup. The entry (660) may be identified using the differencing disk C identifier (662), and the backup type may be identified as a dependent backup (664). The entry may be generated on day 4 (666).

End of Example 1

Figure 7:
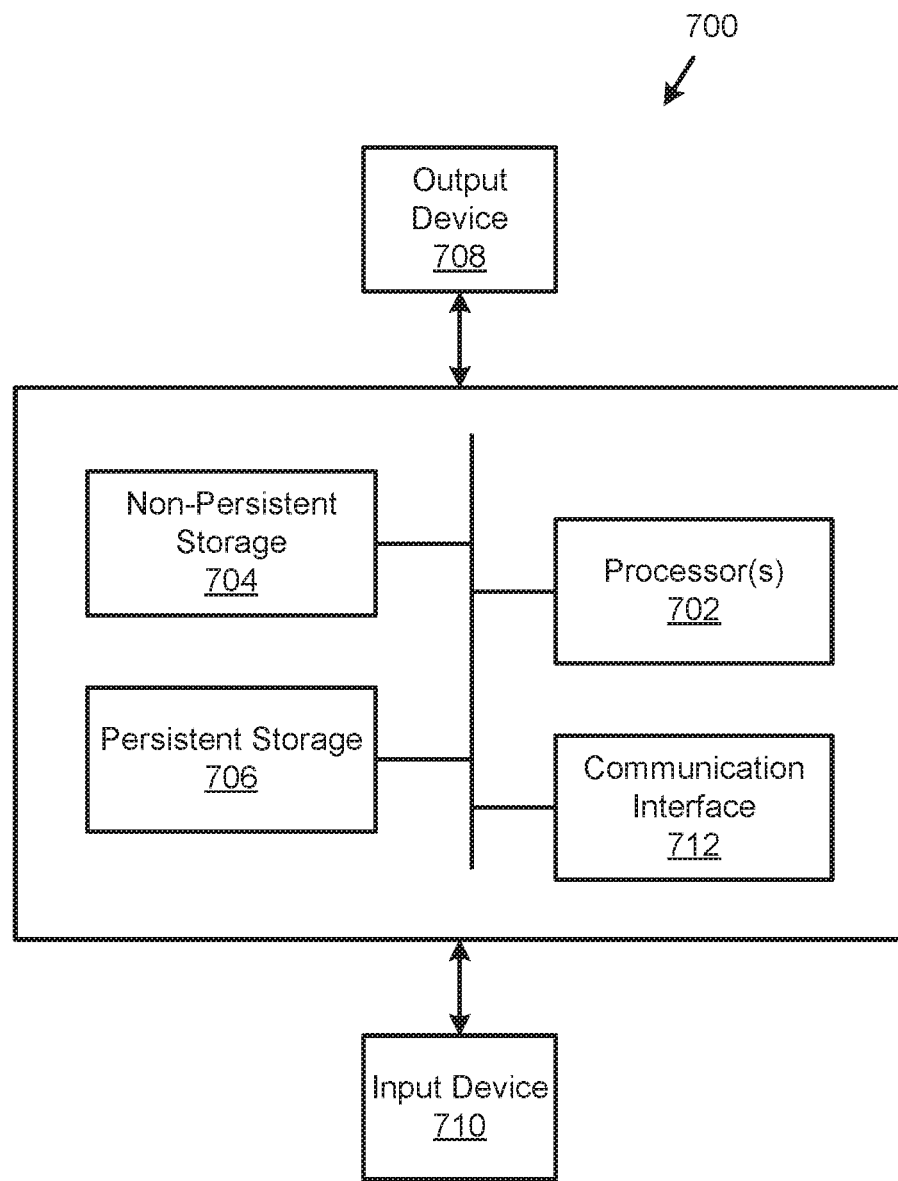
FIG. 7 shows a diagram of a computing device in accordance with one or more embodiments of the invention.

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may improve the operation of one or more computing devices. More specifically, embodiments of the invention may improve the reliability of storing data on a computing device. The reliability may be improved by monitoring backups stored in a backup storage and ensuring that the backups are generated as scheduled. A restoration of a virtual machine to a previous state may not be possible if backups are not generated as scheduled. For example, a not-generated backup may be associated with a previous state of a virtual machine. The virtual machine may not be restored to the previous state if the not-generated backup does not exist. Additionally, dependent backups may depend on the not-generated backup. Without the backup that was not generated, the backups dependent on the not-generated backups may not be used to restore the virtual machine to a previous state associated with the dependent backups. Therefore, the dependent backup may be useless data stored in the backup storage. Embodiments of the invention may improve the operation of the backup storage by ensuring that dependent backups are useable for restoration purposes.

Thus, embodiments of the invention may address the problem of inefficient use of computing resources. This problem arises due to the technological nature of the environment in which backup policies are implemented. For example, embodiments of the invention may improve the quantity of available storage by ensuring that all backups in storage are usable for restoration purposes. Similarly, embodiments of the invention may improve the efficiency of processor usage by ensuring that generated backups are usable. Doing so may prevent the consumption of computing resources that would otherwise be wasted.

While embodiments of the invention have been described as addressing one or more problems, embodiments of the invention are applicable to address other problems and the scope of the invention should not be limited to addressing the problems specifically discussed throughout this application.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A computing device for storing backups of virtual machines, comprising:
 a persistent storage that stores backup policies; and
 a backup manager programmed to:
  identify an end of a backup generation session for a virtual machine of the virtual machines;
  in response to identifying the end of the backup generation session:
   identify a continuity chain implicated by the backup generation session using the backup policies;
   perform a membership analysis of the identified continuity chain to identify a continuity state of the continuity chain;
   make a first determination that the identified continuity chain is broken based on the identified continuity state; and
   in response to the first determination:
    perform a backup generation analysis to identify a type of a backup;
    make a second determination that the type of the backup is an anchor backup type;
    in response to the second determination:
     generate an anchor backup for the virtual machine; and
     update the backup policies using the generated anchor backup.

2. The computing device of claim 1, wherein performing the membership analysis comprises:
 identifying a plurality of backups associated with the identified continuity chain;
 associating each of the respective backups of the plurality of backups with respective links in the identified continuity chain;
 making a second determination that at least one link of the identified continuity chain is not associated with a respective backup of the plurality of backups; and
 identify the continuity state of the identified continuity chain as invalid in response to the second determination.

3. The computing device of claim 1, wherein the continuity chain is based on the backup policies.

4. The computing device of claim 3, wherein the backup policies specify the generation of:
 a second anchor backup; and
 a dependent backup associated with the anchor backup.

5. The computing device of claim 4, wherein the backup policies specified that the dependent backup was scheduled to be generated during the backup generation session, wherein the dependent backup was not generated during the backup generation session.

6. The computing device of claim 1, wherein the backup generation session is associated with a policy of the backup policies.

7. The computing device of claim 6, wherein the continuity chain implicated by the backup generation session is identified using the policy of the backup policies.

8. A method for storing backups of virtual machines, comprising:
  identifying an end of a backup generation session for a virtual machine of the virtual machines;
  in response to identifying the end of the backup generation session:
    identifying a continuity chain implicated by the backup generation session;
    performing a membership analysis of the identified continuity chain to identify a continuity state of the continuity chain;
    making a first determination that the identified continuity chain is broken based on the identified continuity state; and
    in response to the first determination:
      performing a backup generation analysis to identify a type of a backup;
      making a second determination that the type of the backup is an anchor backup type;
      in response to the second determination:
        generating an anchor backup for the virtual machine; and
        updating the backup policies using the generated anchor backup.

9. The method of claim 8, wherein performing the membership analysis comprises:
  identifying a plurality of backups associated with the identified continuity chain;
  associating each of the respective backups of the plurality of backups with respective links in the identified continuity chain;
  making a second determination that at least one link of the identified continuity chain is not associated with a respective backup of the plurality of backups; and
  identify the continuity state of the identified continuity chain as invalid in response to the second determination.

10. A non-transitory computer readable medium comprising computer readable program code, which when executed by a computer processor enables the computer processor to perform a method for storing backups of virtual machines, the method comprising:
  identifying an end of a backup generation session for a virtual machine of the virtual machines;
  in response to identifying the end of the backup generation session:
    identifying a continuity chain implicated by the backup generation session;
    performing a membership analysis of the identified continuity chain to identify a continuity state of the continuity chain;
    making a first determination that the identified continuity chain is broken based on the identified continuity state; and
    in response to the first determination:
      performing a backup generation analysis to identify a type of a backup;
      making a second determination that the type of the backup is an anchor backup type;
      in response to the second determination:
        generating an anchor backup for the virtual machine; and
        updating the backup policies using the generated anchor backup.

11. The non-transitory computer readable medium of claim 10, wherein performing the membership analysis comprises:
  identifying a plurality of backups associated with the identified continuity chain;
  associating each of the respective backups of the plurality of backups with respective links in the identified continuity chain;
  making a second determination that at least one link of the identified continuity chain is not associated with a respective backup of the plurality of backups; and
  identify the continuity state of the identified continuity chain as invalid in response to the second determination.

* * * * *